June 20, 1950     Y. FUJISAKI     2,512,458
SLIDE RULE

Filed Nov. 26, 1949

INVENTOR.
Yohei Fujisaki
BY Robert E. Burns
ATTORNEY

Patented June 20, 1950

2,512,458

UNITED STATES PATENT OFFICE 2,512,458

SLIDE RULE

Yohei Fujisaki, Tokyo, Japan

Application November 26, 1949, Serial No. 129,636

In Japan May 4, 1947

5 Claims. (Cl. 235—84)

This invention relates to improvements in slide rules, especially of circular ring or cylindrical type having one fixed scale and two movable rings, each having one cursor fixed thereto, and has for its principal object to provide a slide rule which is convenient in handling and facilitates quick and more accurate continuous calculation of multi-stage multiplications and divisions of a group of numbers.

Another object of the invention is to provide a slide rule of flat ring type which is not liable to miss the order of calculations.

With the above and other objects in view the invention consists of certain novel feature of scale arrangements and combination of a fixed scale and two rotatable rings with fixed cursor hereinafter fully described and claimed, it being understood that various modifications and addition of other scales may be resorted to within the scope of the appended claims without departing from the spirit or sacrificing any of the advantages of the invention.

In the accompanying drawing, forming a part of this specification:

Figure 1:
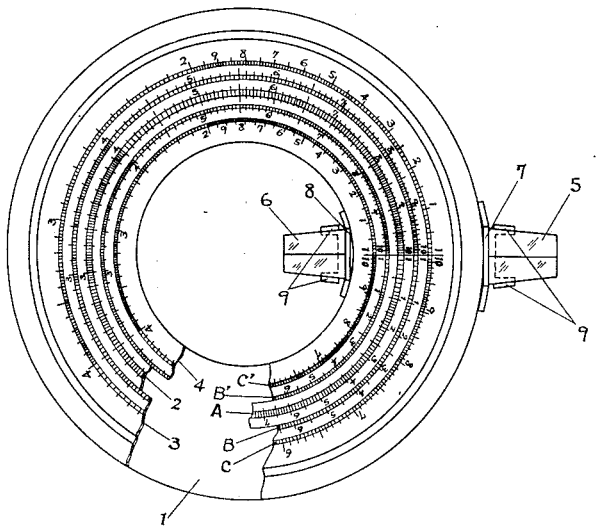
Fig. 1 is a front view of the slide rule embodying this invention.

Heretofore known straight and circular slide rules usually consist of one fixed member, one sliding member and one movable cursor, and the fixed scale and sliding scale corresponding thereto are calibrated with the logarithmic numbers from 1 to 100 and 1 to 10 along the total length. If a number of multi-stage multiplications and divisions are to be calculated with such an ordinary slide rule, the cursor and slide should repeatedly be shifted to and fro. For instance, in doing a single multiplication or division the cursor is moved to the position of a given number on the fixed scale, and the sliding scale is shifted to coincide its necessary scale line (1 in case of multiplication and the dividend in case of division) with the reading line on the cursor which is brought to a position corresponding to a given number on the fixed scale, and then the cursor is shifted to a required scale line corresponding to a multiplier (in case of multiplication) or 1 (in case of division) to obtain the result. Such operation should be repeated for multi-stage multiplication or division of a group of numbers so that it takes not only time and labour for obtaining the result but also it is liable to cause error due to uncoincidence of the cursor line and the scale line. In heretofore known circular disc type slide rules there are similar defects since there is no improvements given to scale arrangements.

This invention is to obviate the above defects by improving construction and arrangement of scale divisions in such manner that it is only necessary to turn the movable scales once for each calculation, so that the multi-stage multiplication or division of many numbers can be effected more quickly with accuracy, thereby saving time and labour necessary for calculation. The slide rule of this invention is characterized in that a fixed scale is calibrated with logarithmic numbers from 1 to 10 clockwise along a complete circle on the fixed ring and two concentric movable rings are rotatively fitted to the inside and outside of the fixed ring, each having the same logarithmic scale from 1 to 10 calibrated clockwise along a complete circle and another same scale calibrated in counter-clockwise direction and a cursor is fixed to each of the rotatable rings at the position of original line where 1 and 10 coincide. Thus the novel feature of the slide rule of this invention lies in that one fixed scale is made to co-operate with two rotatable scales, each of which being fixed to a cursor and turned thereby. In order to prevent the interference of two cursors on the way of their turning, the cursor is pivotally secured to the movable ring so as to be lifted or lowered about a hinge axis.

Now referring to the drawing which shows an embodiment of this invention, 1 designates a base plate made of light metal such as aluminium plate for instance, having a flat circular ring 2 fixed thereto. 3 and 4 represent concentric circular rings rotatably fitted to the outside and inside of the fixed ring 2 respectively. The fixed ring 2 has the "A-scale" corresponding to logarithmic scale 1 to 10 graduated along a complete circle in clockwise direction. The movable flat rings 3 and 4 have the "B-scale" and "B'-scale" similar to the "A-scale" calibrated clockwise preferably along the outer and inner periphery of the respective ring, and also the "C-scale" and "C'-scale" of 1 to 10 logarithmic numbers calibrated on the flat surface of the rings 3 and 4 along a complete circle in the counter-clockwise direction, the original lines of the scales B and C as well as B' and C' starting and finishing on the same radial lines. 5 and 6 represent outer and inner cursors fixed to the movable rings 3 and 4 respectively at the position of original line, with which the reading line of cursor coincides.

Figure 2:
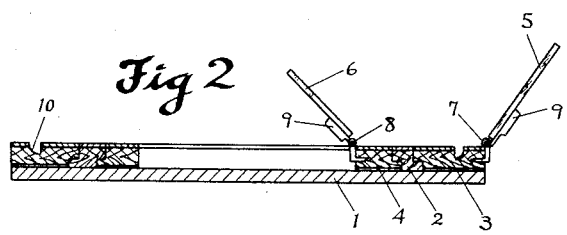
Fig. 2 is a sectional elevation of the slide rule shown in Fig. 1 with the cursors in lifted positions.

The cursors 5 and 6 are secured to the ring plates 3 and 4 respectively by means of a hinge joint as shown by 7 and 8 in Figs. 1 and 2. The hinge is provided with lugs 9 serving as finger clip for turning the rings 3 and 4. Thus the glass plates of the cursor can be raised or turned down about the hinge axes 7 and 8 to avoid interference with each other in the way of turning the slide. According to such construction, the reading line on each cursor 5 and 6 is always in coincidence with the original scale line 1 and 10 of the "B- and C-scales" and the "B'- and C'-scales" respectively irrespective of the position of these movable rings.

Figure 3:
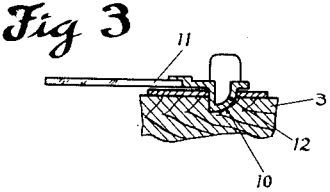
Fig. 3 is a side elevation of a sub-cursor showing a part of auxiliary groove in section.
Figure 4:
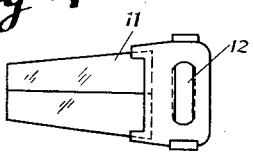
Fig. 4 is a plan view of the sub-cursor.

The slide rule may also have a circular groove 10 cut on one of the movable rings, preferably on the outer ring 3 and a sub-cursor 11 as shown in Figs. 3 and 4 is detachably fitted to the auxiliary groove 10. The sub-cursor 11 is conveniently used for reading the scale by attaching it to a desired position of the groove 10 by the leg 12 and by sliding along the groove. The sub-cursor can be taken off after use.

The operation of the slide rule of this invention will be explained with following examples. Assume, for instance, to make continuous calculation of the product of numbers 4×8×12×15, bring the reading line of cursor 5 of the outer slide ring 3 to coincide with the scale line 4 on the fixed "A-scale" and then the inner slide 4 is turned to have the line on the cursor 6 coincide with the scale line corresponding to the number 8 on the fixed "B-scale," then the reading below the cursor 6 is taken on the "A-scale," which will show 32, that is, the product of 4×8. Since in this case the original line 1 on the "B'-scale" of the inner slide ring 4 coincides with the scale graduation 32 on the "A-scale" that is the graduation corresponding to the product of the first calculation, the reading on the "A-scale" corresponding to 12 on the "B'-scale" will give the answer of 32×12. Accordingly if the outer slide ring 3 is turned to bring its cursor line to coincide with the scale line 12 on the "B'-scale," the number 384 will be read on the "A-scale." Since at this time the original line 1 of the "B-scale" lies on the graduation of 384 on the "A-scale," the inner slide 4 is moved similarly to the former operation to the position of the scale line 15 on the "B-scale," where the cursor line coincides with the graduation of 15, then the reading on the "A-scale" below the cursor line will give the answer of 384×15. In short, by turning the inner and outer cursors alternately, the operation of bringing the reading line on a cursor to coincide with a required scale on the "A-scale" and the operation of bringing the original line of the "B- or B'-scale" to coincide with the scale line showing the answer of the former calculation can be done simultaneously.

For making the calculation of division, the "C- and C'-scales" are used instead of the "B- and B'-scales" respectively in the former example. Since the "C- and C'-scales" are calibrated in the direction opposite to the "A-scale," it will be evident that the dividend instead of product can be obtained by using these scales in the similar manner to that of obtaining product. For instance, if it is required to calculate 384÷32÷4 the cursor line of the outer scale 3 is brought on the graduation 384 on the "A-scale," then if the inner slide is moved to have the cursor line coincide with 32 on the "C-scale," the graduation on the "A-scale" below the cursor line will give 12 which is the answer of the dividend of 384÷32. Next the outer cursor line is brought to coincide with 4 on the "C'-scale," then the reading on the "A-scale" below the cursor line will give the answer, that is, 3.

In the similar manner, a series of multi-stage calculation of multiplication and division can be carried out easily by using the "B- and B'-scale" for division, the manner of moving the slides together with cursors being same in the multiplication and division. Accordingly the present invention can avoid the mistake which might occur in heretofore ordinary slide rules owing to missetting of cursor when the multiplication and division are to be calculated continuously.

The auxiliary groove 10 and the sub-cursor 11 are conveniently used for a simple multiplication or division. In case of multiplication of two numbers, the cursor line of a slide is brought on the graduation corresponding to a required number to be multiplied, then if the sub-cursor is fitted to the groove 10 and moved to the graduation corresponding to a multiplier, the number below the cursor line will give the required product. In case of division of two numbers, the dividend can be obtained by using the sub-cursor on the counter-clockwise scale in the similar manner. Thus the trouble of moving the other slide can be saved.

For multi-stage multiplication and division such as $$\frac{a \times b \times c \times d}{e \times f \times g}$$

the result can easily be obtained with the slide rule of this invention by making continuous multiplication of $a \times b \times c \times d$ on the normal scales and then by making successive division of $e \times f \times g$ using the reverse scale. On the other hand, in ordinary slide rules it is usually customary to calculate $a \times b$ at first and then the division by $e$ which is multiplied by $c$ and divided by $f$, and multiplied by $d$ and afterwards divided by $g$. Accordingly the slide and cursor should be moved very often and moreover there occurs trouble of shifting back the slide to the opposite direction when the reading can not be taken on the fixed scale directly.

Though I have shown and described in the foregoing an embodiment of my invention as applied to the calculation of products and dividends of natural numbers, yet other scales such as sine- and cosine-scales can be graduated on the slide to find out the value of sine or cosine of an angle with reference to the logarithm of natural numbers and also the principle of the present slide rule can be applied to a cylindrical slide rule as desired. It is preferable to distinguish, for the sake of convenience in using the normal scale and reverse scale such as the "B- and B'-scales" and the "C- and C'- scales," by different coloured lines, for instance, the latter scales by red lines.

Having thus described my invention, what I claim as new and desire to secure by Letters Patent of the United States is:

1. A slide rule which comprises one fixed scale which is graduated with logarithmic units of natural numbers in one direction, two independently movable slides co-operating with said fixed scale, each having one logarithmic scale which is same as that on said fixed scale graduated in the same direction and the other logarithmic scale graduated in the reverse direction starting from the same original line, and two cursors, each of which is fixed to each of said two slides at the position of the original line of scale graduation and moved together with said slide respectively.

2. A slide rule of circular ring type, which comprises a fixed scale, two slides rotatably fitted to said fixed scale and a cursor each fixed to respective slides, said fixed scale having logarithmic scale of certain numbers graduated along a complete circle and each of said slides having the same logarithmic scale as that on the fixed scale and also another scale which is same as that on the fixed scale but graduated in the opposite direction thereto, each of said cursors being hinged to respective slides at the original point of the scale with the reading line on the cursor passing through the original point.

3. A slide rule of flat circular ring type, which comprises a fixed scale, called "A-scale," calibrated with logarithmic scale of natural numbers from 1 to 10 along a complete circle radially and advancing in clockwise direction, rotatable scales fitted to the outside and inside respectively of said fixed scale concentrically therewith and to be turned each independently, each of said rotatable scales having the same logarithmic scale of natural numbers from 1 to 10 as those on the fixed scale graduated radially along a complete circle in clockwise direction, called "B-scale" and "B'-scale" respectively and another logarthmic scale of the same numbers graduated radially along a concentric circle advancing in counter-clockwise direction called "C-scale" and "C'-scale" respectively, said "B- and C-scales" and "B'- and C'-scales" being started from the same original point, and cursors fixed to each of said rotatable scales at the original point having the reading line coincide with the original point of the scale.

4. A slide rule of flat circular ring type, which comprises a fixed ring having a logarithmic scale of numbers from 1 to 10 called "A-scale" graduated radially along a complete circle in clockwise direction, rotatable rings fitted to outside and inside respectively of said fixed ring to be turned independently, said rotatable rings having the same logarithmic scales of numbers as those on the fixed scale graduated in clockwise direction called "B-scale" and "B'-scale" respectively and other logarithmic scales of the same numbers but graduated in counter-clockwise direction called "C-scale" and "C'-scale," said "B- and C-scales" and "B'- and C'-scales" being started from the same original point, cursors fixed to each of said movable scales at the position of the original point having the reading line on the cursor coincide with the original point, a circular groove cut on said outer rotatable ring concentrically and a sub-cursor detachably fitting to said circular groove and to be turned along the groove as desired.

5. A slide rule of cylindrical ring type, which comprises a fixed cylindrical part calibrated with logarithmic scale of numbers from 1 to 10 called "A-scale" around the periphery thereof, rotatable members fitted to both sides of said fixed cylindrical part, each of said rotatable members having the same logarithmic scale as "A-scale" called "B-scale" and "B'-scale" respectively and also another scale which is graduated in the opposite direction called "C-scale" and "C'-scale" respectively, "B and C"; "B' and C'" scales being graduated from the same original point, and cursors fixed to each of said rotatable scales at the original point, through which the reading line on the cursor passes.

YOHEI FUJISAKI.

No references cited.